(12) United States Patent
Smith

(10) Patent No.: US 12,128,759 B2
(45) Date of Patent: Oct. 29, 2024

(54) UTV PORTAL AXLE SYSTEM

(71) Applicant: Shock Therapy Suspension, Inc., Duluth, GA (US)

(72) Inventor: Justin Smith, Phoenix, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 18/346,654

(22) Filed: Jul. 3, 2023

(65) Prior Publication Data

US 2023/0347735 A1 Nov. 2, 2023

Related U.S. Application Data

(63) Continuation of application No. 17/385,499, filed on Jul. 26, 2021, now abandoned, which is a continuation of application No. 16/676,299, filed on Nov. 6, 2019, now Pat. No. 11,072,237.

(60) Provisional application No. 62/756,349, filed on Nov. 6, 2018.

(51) Int. Cl.
*B60K 17/10* (2006.01)
*B60G 1/04* (2006.01)
*F16H 37/06* (2006.01)

(52) U.S. Cl.
CPC ............ *B60K 17/105* (2013.01); *B60G 1/04* (2013.01); *F16H 37/06* (2013.01); *B60G 2300/07* (2013.01); *B60K 2360/61* (2024.01)

(58) Field of Classification Search
CPC .... B60K 17/105; B60K 2360/61; B60G 1/04; B60G 2300/07; F16H 37/06
See application file for complete search history.

(56) References Cited

U.S. PATENT DOCUMENTS

| | | | |
|---|---|---|---|
| 8,118,133 B2 * | 2/2012 | Armfield | B60B 35/001 |
| | | | 180/371 |
| 8,844,669 B2 | 9/2014 | Armfield | |
| 8,985,264 B2 * | 3/2015 | Shirley | B60K 17/043 |
| | | | 180/371 |
| 10,527,130 B2 | 1/2020 | Shirley | |
| 11,207,975 B2 * | 12/2021 | Wood | B60B 35/001 |
| 11,318,787 B2 | 5/2022 | Stephan et al. | |

(Continued)

FOREIGN PATENT DOCUMENTS

| | | | | |
|---|---|---|---|---|
| DE | 102017111785 | | 12/2018 | |
| DE | 102017111785 A1 * | | 12/2018 | B60G 3/20 |

*Primary Examiner* — Thomas C Diaz
(74) *Attorney, Agent, or Firm* — Schmeiser, Olsen & Watts LLP

(57) ABSTRACT

A UTV portal axle system is disclosed, including a spindle with a housing for housing input and output drive gears coupled by one or more idler gears. The output drive gear is disposed lower than the input drive gear to provide additional ground clearance to the UTV. The king pin axis angle is substantially the same as that of a stock UTV, while maintaining a scrub radius of substantially one inch or less. This is accomplished by the lower control arm ball joint being located within a recess of the output drive gear. This allows the UTV to be properly controlled when driven at high speeds over rough or uneven terrain. The gears may be interchangeable to allow the gear ratio to be adjusted to be more suitable for use at various driving speeds. A method of changing the gear ratio is also disclosed.

12 Claims, 5 Drawing Sheets

(56) References Cited

U.S. PATENT DOCUMENTS

2012/0181850 A1 7/2012 Armfield
2014/0230602 A1 8/2014 Shirley

* cited by examiner

UTV PORTAL AXLE SYSTEM

CROSS REFERENCE TO RELATED APPLICATION[S]

This application is a continuation of U.S. patent application entitled "UTV PORTAL AXLE SYSTEM," Ser. No. 17/385,499, filed Jul. 26, 2021, which is a continuation of U.S. patent application entitled "UTV PORTAL AXLE SYSTEM," Ser. No. 16/676,299, filed Nov. 6, 2019, now U.S. Pat. No. 11,072,237, issued Jul. 27, 2021, which claims priority to U.S. Provisional Patent Application entitled: "UTV PORTAL AXLE SYSTEM," Ser. No. 62/756,349, filed Nov. 6, 2018, the disclosures of which are hereby incorporated entirely herein by reference.

BACKGROUND OF THE INVENTION

Technical Field

This invention relates generally to portal axle systems for vehicles and particularly to a portal axle system with correct geometry and multiple gear sets for use on a utility task vehicle in both low-speed and high-speed applications.

State of the Art

Conventional portal axles are often used on off-road vehicles to provide increased ground clearance of differential housings and to allow for gear ratios that reduce the torque required in axle shafts to deliver the same power to the wheels by using higher shaft rotational velocity.

Typically, a conventional portal axle system for a utility task vehicle (UTV) is sold as an after-market system. Stock axle, spindle and wheel systems of UTVs have a scrub radius that is substantially one (1) inch or less, wherein the scrub radius is the distance in front view between the king pin axis and the center of the contact patch of the tire, where both would theoretically touch the road, and the kingpin axis is the line passing through the centers of the upper and lower ball joints of the spindle. UTVs having a scrub radius of substantially one (1) inch or less provide a comfortable amount of feedback to a driver, through the steering wheel of the UTV, while the UTV is in motion, and particularly when executing turns, at low speeds and high speeds.

One problem with conventional after-market UTV portal axle systems is that, in order to maintain the correct kingpin axis inclination angle, as in a stock system, the scrub radius is necessarily increased, due to the size and shape of the spindle of such conventional systems. For example, the scrub radius may be increased, from substantially one inch or less, in stock systems, to two or three inches after the conventional portal axle system is installed. Although it is not ideal, a large scrub radius may be acceptable for conventional systems with intended use on UTVs for low-speed applications, such as rock crawling and mud bogging at speeds of less than about thirty (30) mph, for example. However, such a large scrub radius creates significant problems for UTVs used in high-speed applications at more than about thirty (30) mph, such as racing. For example, at high speeds, the large scrub radius of conventional systems causes a significantly large amount of feedback to the vehicle driver, through the steering wheel of the vehicle, making the vehicle very difficult for the driver to rotate the steering wheel for turning at high speeds. In addition, at high speeds over rough and uneven terrain, significant shock loads are transferred from the wheels to the steering wheel, causing jolting in the steering wheel and possibly ripping the steering wheel from the driver's hands. In addition, shock loads are similarly transferred from the wheels to other front-end parts and steering racks, causing damage to these and other vehicle components. Furthermore, the uncontrollability of the UTV at high speeds, due to the large scrub radius, poses a risk of the driver crashing the vehicle.

A second problem with conventional portal axle systems is that they have a single gear ratio that is often intended for use on UTVs for low-speed applications, such as rock crawling and mud bogging at speeds of less than about thirty (30) mph, for example. The single low-speed gear ratio is advantageous in that it reduces the torque required in axle shafts to deliver the same power to the wheels, as in stock systems, by using higher shaft rotational velocity. However, the single low-speed gear ratio of conventional after-market portal axle systems is not suitable for use on UTVs at high speeds of about thirty (30) mph or more.

Accordingly, an improved portal axle system is needed for use on UTVs in both low and high-speed applications.

SUMMARY OF THE INVENTION

The present invention relates generally to portal axle systems for vehicles and particularly to a portal axle system with correct geometry and multiple interchangeable gear sets for use on a UTV in both low-speed and high-speed applications.

Embodiments of a UTV portal axle system comprise a spindle having an integrated housing for housing a set of gears. The spindle has an upper bracket configured for coupling to an upper control arm of a UTV and a lower bracket configured for coupling to a lower control arm of the UTV.

Embodiments comprise an input drive gear and an output drive gear housed within the housing. Some embodiments also comprise at least one idler gear housed within the housing. The input drive gear may be rotationally coupled within the housing and configured for coupling to a drive axle of the UTV. The output drive gear may also be rotationally coupled within the housing and configured for coupling to a wheel hub shaft of the UTV. The output drive gear may be disposed a predetermined spaced distance below, and substantially coplanar with, the input drive gear, such that the output drive gear does not engage the input drive gear. The distance between the centers of the input and output drive gears corresponds to the amount of additional lift, or ground clearance, provided to the UTV by the UTV portal axle system.

Torque may be transferred from the input drive gear to the output drive gear by means of at least one idler gear rotationally coupled within the housing, wherein the at least one idler gear is disposed substantially coplanar with the input and output drive gears.

The output drive gear is a recessed gear. The recess of the output drive gear allows for the lower bracket to be disposed within the recess, thereby maintaining the scrub radius to not more than one inch while the original stock king pin axis inclination angle is maintained. In this way, the geometry of the original stock suspension system is substantially maintained, allowing for safe use of the UTV on rough terrain and/or at high speeds, such as at speeds over 30 mph, without the steering feedback problems associated with conventional after-market UTV portal axle systems.

In some embodiments, any of the input drive gear, the output drive gear, and the at least one idler gear, may be removable and replaceable with a gear of a different diameter. Thus, the gear ratio between input to and output from the gear box may be increased or decreased. A lower gear ratio may be suitable for use of the UTV at low speeds, and a higher gear ratio may be suitable for use of the UTV at high speeds.

A method of changing the gear ratio of a UTV portal axle system is also disclosed.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
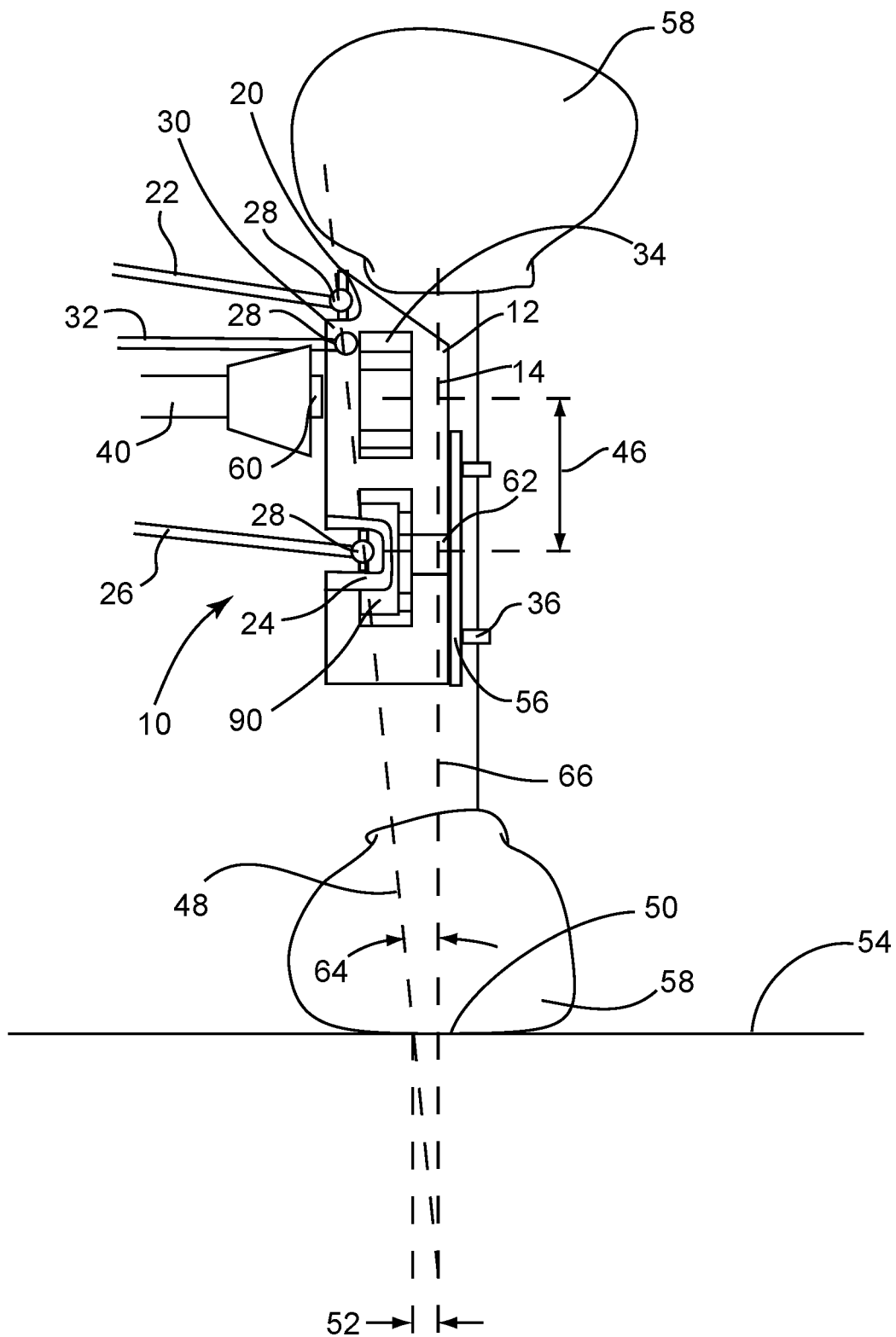
FIG. 1 is a front section view of a UTV portal axle system in accordance with an embodiment.

As discussed above, embodiments of the present invention relate generally to portal axle systems for vehicles and particularly to a portal axle with correct geometry and multiple gear sets for use on a utility task vehicle (UTV) in both low-speed and high-speed applications.

A UTV, for purposes of this application, includes any of a class of vehicles to which any of the following names, without limitation, has been attributed: Utility Task Vehicle (UTV), Utility Terrain Vehicle (UTV), Recreational Off-Highway Vehicle (ROV), Recreational Utility Vehicle (RUV), and Side-by-Side (SXS). Most conventional UTVs in use today share the following characteristics, without limitation: off-road design, at least four wheels, at least one non-straddle seat with a belt, a steering wheel, foot pedals, a roll cage, a width of less than 65 inches, and an unladen dry weight of less than 2,000 lbs. Although these characteristics are not intended to be limiting, it should be understood that conventional UTVs are distinguishable from conventional ATVs having a straddle seat and handle bar steering, such as four wheelers, quads, or the like, as well as from other general-purpose passenger vehicles used in off-roading, such as Jeeps, Hummers, pickup trucks, and the like.

Referring to the drawings, as shown in FIGS. 1-4, embodiments of a UTV portal axle system 10 comprise a spindle 12 having an integrated housing 14 for housing a set of gears 16. As with conventional spindles, the spindle 12 has an upper bracket 20 configured for operational coupling to an upper control arm 22 of a UTV and a lower bracket 24 configured for operational coupling to a lower control arm 26 of the UTV. Each of the upper and lower control arms 22 and 26 may be coupled to the upper and lower brackets 20 and 24, respectively, using a coupling device 28 such as a ball joint, for example. The spindle 12 may also have a bracket 30 for coupling to a steering mechanism tie rod 32 of the UTV, using a coupling device 28 such as a ball joint, or heim joint, or the like.

FIG. 1 is a front section view of a UTV portal axle system 10, mounted to a vehicle, in accordance with an embodiment. As shown in FIG. 1, tire 58 is supported on the ground 54, and mounted to wheel hub 56, which is coupled to the UTV portal axle system 10. King pin axis 48 is the line that passes through the centers of coupling devices 28 of the upper and lower brackets, 20 and 24, respectively. Scrub radius 52, is the distance of separation between king pin axis 48 and the center 50 of the contact patch of the tire 58 where the tire 58 meets the ground 54. The inclination angle 64 of the king pin axis 48 is the angle between the king pin axis 48 and center line 66, wherein the center line 66 is the line passing vertically through the center 50 of the contact patch of the tire 58 where the tire 58 meets the ground 54.

In accordance with the present invention, embodiments of a UTV portal axle system 10 comprise an input drive gear 34 and an output drive gear 36 housed within the housing 14 of the spindle 12. In some embodiments, the spindle 12 also comprises at least one idler gear 38 housed within the housing 14. Each of the input drive gear 34, the output drive gear 36, and the at least one idler gear 38 may be a spur gear, a helical gear, or the like.

The input drive gear 34 may be rotationally coupled within the housing 14, the input drive gear 34 being configured for coupling to a drive axle 40 of the UTV. For example, the input drive gear 34 may have a splined aperture therethrough for receiving a splined end of the drive axle 40. The drive axle 40 may extend through a first aperture 60 in the housing to engage the input drive gear 34 within the housing 14 such that the longitudinal axes of the drive axle 40 and the input drive gear 34 are colinear and the input drive gear 34 rotates in response to rotation of the drive axle 40. The input drive gear 34 may be mounted, for example, by a bearing, such as a ball bearing or pin bearing, or the like, to a pin that protrudes from a wall of the housing 14. Alternatively, the pin may protrude from a cover plate 44 that is integrated into a wall of the housing 14. In some embodiments, the bearing may be coupled within a bearing aperture in a wall of the housing 14. The means by which the drive axle 40 is coupled to the input drive gear 34, and the means by which the input drive gear 34 is coupled to the housing 14, as described herein, are not intended to be limiting. The drive axle 40 may be coupled to the input drive gear 34, and the input drive gear 34 may be coupled to the housing 14, by any means that is consistent with the intended functionality of a UTV portal axle system 10 in accordance with the present invention.

The output drive gear 36 may be rotationally coupled within the housing 14, the output drive gear 36 being configured for coupling to a wheel hub shaft 42 of the UTV. For example, the output drive gear 36 may have a splined aperture therethrough for receiving a splined end of the hub shaft 42. The hub shaft 42 may extend through a second aperture 62 in the housing 14 to engage the output drive gear 36 within the housing 14 such that longitudinal axes of the hub shaft 42 and the output drive gear 36 are colinear and the hub shaft 42 rotates in response to rotation of the output drive gear 36. The output drive gear 36 may be mounted, for example, by a bearing, such as a ball bearing or pin bearing, or the like, to a pin that protrudes from a wall of the housing 14. Alternatively, the pin may protrude from a cover plate 44 that is integrated into a wall of the housing 14. In some embodiments, the bearing may be coupled within a bearing aperture in a wall of the housing. The means by which the hub shaft 42 is coupled to the output drive gear 36, and the means by which the output drive gear 36 is coupled to the housing 14, as described herein, are not intended to be limiting. The hub shaft 42 may be coupled to the output drive gear 36, and the output drive gear 36 may be coupled to the housing 14, by any means that is consistent with the intended functionality of a UTV portal axle system 10 in accordance with the present invention.

In embodiments, the output drive gear 36 may be disposed, within the housing 14, a predetermined spaced distance 46 below, and substantially coplanar with, the input drive gear 34, such that the output drive gear 36 does not engage the input drive gear 34. The distance 46 between the centers of the input and output drive gears 34 and 36 corresponds to the amount of additional lift, or ground clearance, provided to the UTV by the UTV portal axle system 10. For example, the distance 46 between the centers of the input and output drive gears 34 and 36 may be 4 inches or 6 inches or 8 inches, corresponding to a 4-inch, 6-inch, or 8-inch lift, respectively. However, the distance 46 between the centers of the input and output drive gears 34 and 36 is not intended to be limited to 4 inches or 6 inches or 8 inches. The distance 46 between centers of the input and output drive gears 34 and 36 may be any distance 46, corresponding to the amount of desired lift, provided the distance 46 is consistent with the intended functionality of a UTV portal axle system 10 of the present invention.

In some embodiments, torque may be transferred from the input drive gear 34 to the output drive gear 36 by means of at least one idler gear 38 rotationally coupled within the housing 14, wherein the at least one idler gear 38 is disposed substantially coplanar with the input and output drive gears 34 and 36. For example, some embodiments may comprise a single idler gear 38 and other embodiments may comprise two idler gears 38. In embodiments that comprise at least one idler gear 38, the at least one idler gear 38 meshes with both the input and output drive gears 34 and 36 such that rotation of the input drive gear 34, in response to rotation of the drive axle 40, rotates the at least one idler gear 38, which, in turn, rotates the output drive gear 36. Rotation of the input drive gear 34 in a first direction rotates the at least one idler gear 38 in a second direction and rotation of the at least one idler gear 38 in the second direction rotates the output idler 36 gear in the first direction.

Some embodiments may not comprise an idler gear 38. In such embodiments, the input drive gear 34 may engage the output drive gear 36 directly. However, in such embodiments, the direction of rotation of the output drive gear 36 is opposite the direction of rotation of the input drive gear 34. It is preferable that the direction of rotation of the output drive gear 36 is the same as the direction of rotation of the input drive gear 34. In some embodiments, the input and output drive gears 34 and 36 may be sprockets or pulleys that are coupled together by a chain or a belt, respectively, or the like, such that the direction of rotation of the output drive gear 36 is the same as the direction of rotation of the input drive gear 34.

As discussed briefly above, one problem with conventional after-market UTV portal axle systems is that they comprise a gear box coupled to a spindle of the UTV. The king pin axis is defined as the line passing through the centers of the upper bracket and the lower bracket of the spindle, and the scrub radius is the distance in front view between the king pin axis and the center 7 of the contact patch of a tire mounted to the wheel hub. Having a scrub radius of substantially one (1) inch or less allows a driver of the UTV to maintain proper control of the vehicle while steering the vehicle, with a comfortable amount of feedback in the steering wheel, whether at low speeds or high speeds, without significant shock loads being transferred to the steering wheel from the wheels encountering rough and uneven terrain. Due to the thickness of the conventional gear box, the scrub radius is increased by an amount equal to the thickness of the gear box when the original stock king pin axis inclination angle is maintained. For example, the scrub radius may be increased by 2 or 3 inches or more in comparison with the original stock scrub radius. This results in substantial steering feedback problems, particularly when the UTV is driven over rough terrain and/or at high speeds, such as at speeds over 30 mph.

Figure 2:
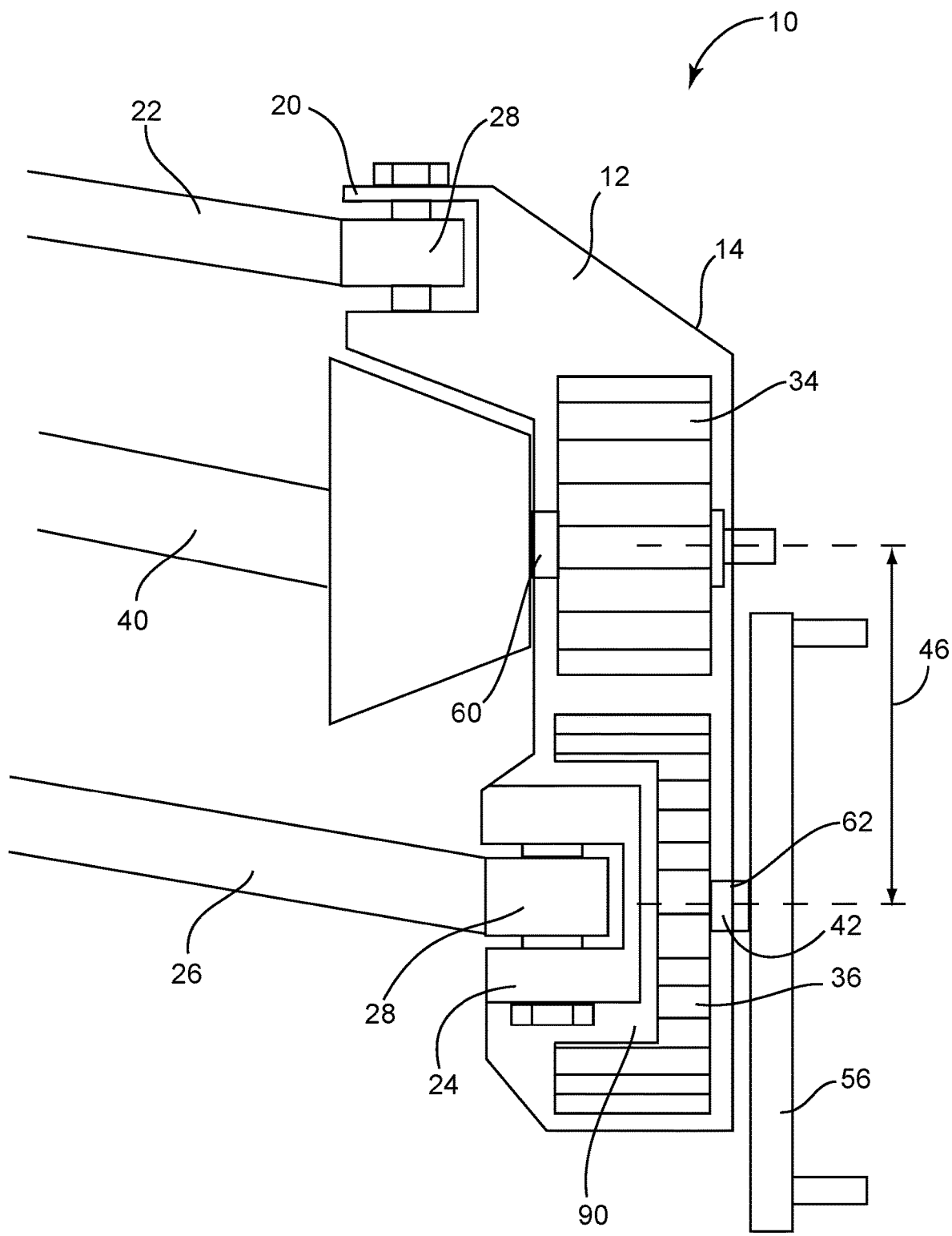
FIG. 2 is another front section view of a UTV portal axle system in accordance with an embodiment.
Figure 3:
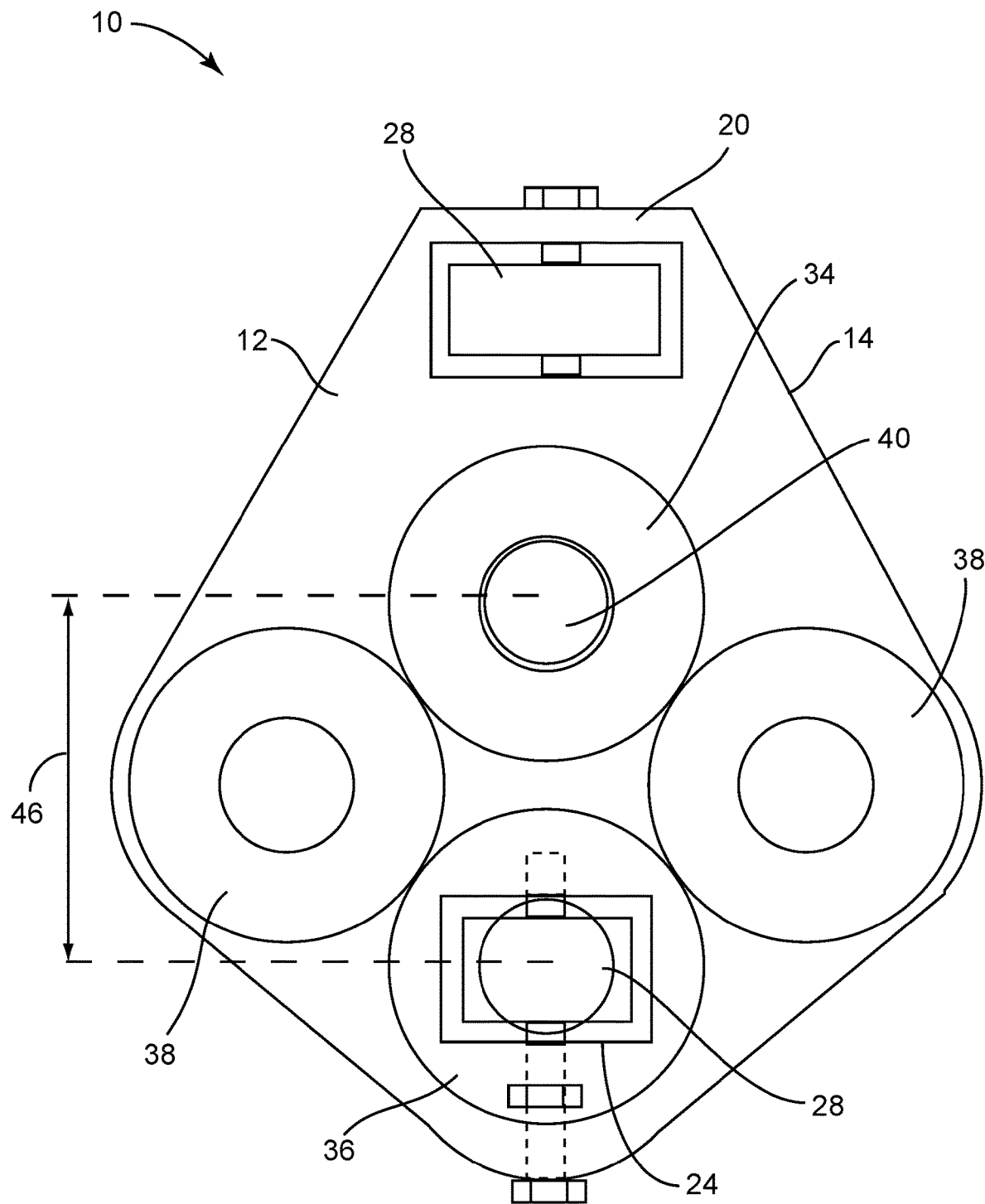
FIG. 3 is a side section view of a UTV portal axle system in accordance with an embodiment.
Figure 4:
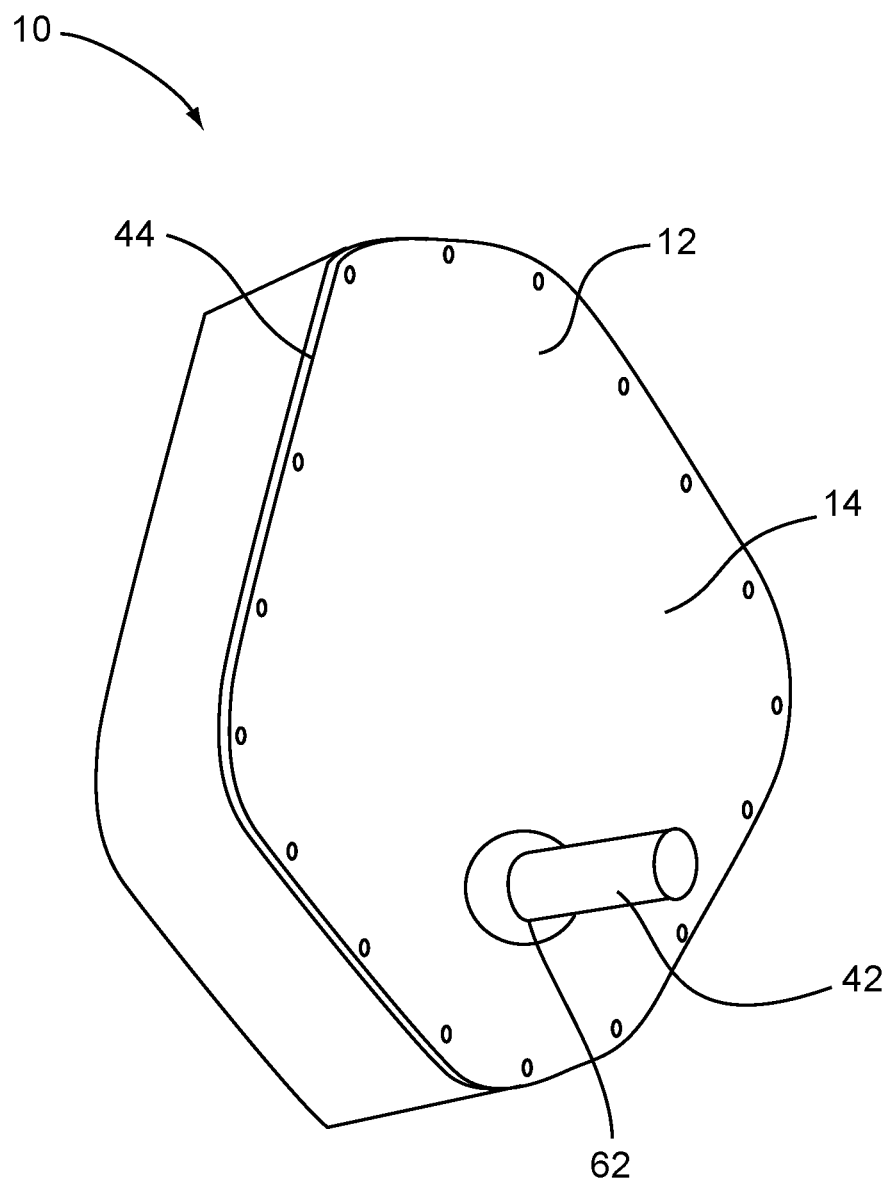
FIG. 4 is a perspective view of a UTV portal axle system in accordance with an embodiment.
Figure 5:
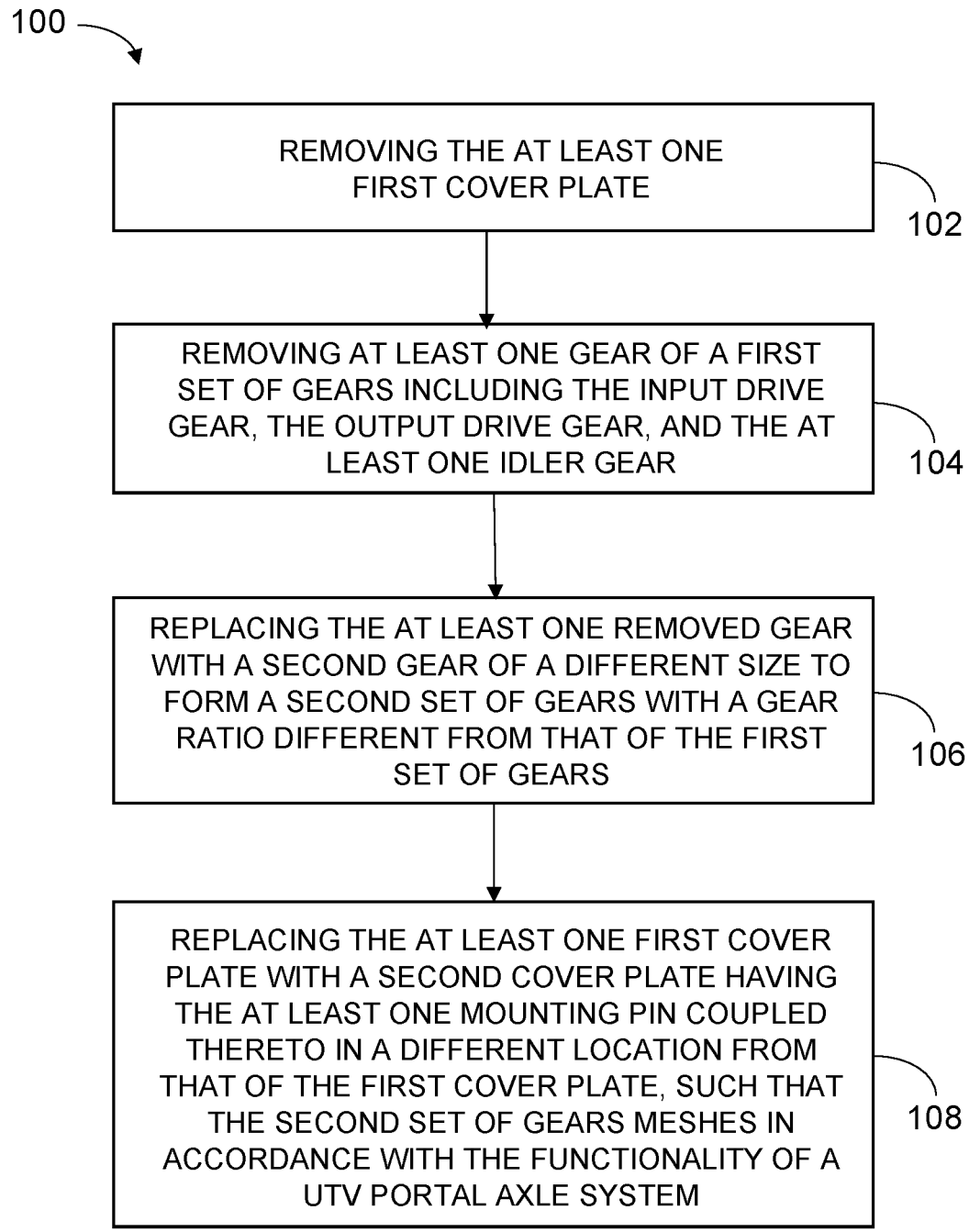
FIG. 5 is a block diagram showing steps of a method of use of a UTV portal axle system in accordance with an embodiment.

In accordance with the present invention, the output drive gear 36 is a recessed gear, as shown in FIGS. 1 and 2. The recess 90 of the output drive gear 36 allows for the lower bracket 24 to be disposed within the recess 90, thereby maintaining the scrub radius 52 to not more than one inch while the original stock king pin axis inclination angle 64 is maintained. In this way, the geometry of the original stock suspension system is substantially maintained, allowing for safe use of the UTV on rough terrain and/or at high speeds, such as at speeds over 30 mph, without the steering feedback problems associated with conventional after-market UTV portal axle systems.

It is preferable, particularly for steered drive wheels, for the lower bracket 24 to be located in line with the longitudinal axis of the wheel hub shaft 42 to avoid further problems associated with steering feedback caused by the lower bracket 24 being located in a position that is not so aligned.

In embodiments, the housing 14 may contain lubricating fluid for lubricating the gears within the housing 14. The housing 14 may comprise a fill port for filling the housing 14 with lubricating fluid and a drain port for draining the lubricating fluid from the housing 14.

In some embodiments, any of the input drive gear 34, the output drive gear 36, and the at least one idler gear 38, may be removable and replaceable with a gear of a different diameter. Thus, the gear ratio between input to and output from the housing 14 may be increased or decreased. A lower gear ratio may be suitable for use of the UTV at low speeds, and a higher gear ratio may be suitable for use of the UTV at high speeds.

For example, a first set of gears may comprise the input drive gear 34, the output drive gear 36, and, in embodiments with at least one idler gear 38, the at least one idler gear 38. In embodiments with at least one cover plate 44, the at least one cover plate 44 may be removed, allowing the first set of gears to be removed, and a second set of gears installed. Because at least one of the input drive gear 34, the output drive gear 36, or the at least one idler gear 38 of the second set of gears has a different diameter than that of the first set of gears, the centers of the gears are necessarily located in a different position, so that the gears of the second configuration will mesh. For this reason, at least one second cover plate 44, having a pin configuration corresponding to the configuration of the second set of gears is then attached to the housing 14 in place of the at least one cover plate 44. Thus, a first set of gears may have a low gear ratio for use on the UTV driven at low speeds, and a second set of gears may have a high gear ratio for use on the UTV driven at high speeds.

A method 100 of changing the gear ratio of a UTV portal axle system is also disclosed. The method 100 comprises: removing the at least one first cover plate [Step 102];

removing at least one gear of a first set of gears including the input drive gear, the output drive gear, and the at least one idler gear [Step 104]; replacing the at least one removed gear with a second gear of a different size to form a second set of gears with a gear ratio different from that of the first set of gears [Step 106]; and replacing the at least one first cover plate with a second cover plate having the at least one mounting pin coupled thereto in a different location from that of the first cover plate, such that the second set of gears meshes in accordance with the functionality of the UTV portal axle system . . . [Step 108].

The components defining any UTV portal axle system 10 may be formed of any of many different types of materials or combinations thereof that can readily be formed into shaped objects provided that the components selected are consistent with the intended operation of a UTV portal axle system 10. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any UTV portal axle system 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:
1. A vehicle portal axle system comprising:
a spindle comprising:
a housing;
an upper bracket configured for operational coupling to an upper control arm of a vehicle; and
a lower bracket configured for operational coupling to a lower control arm of the vehicle;
an input drive gear rotationally coupled within the housing, the input drive gear being configured for coupling to a drive axle of the vehicle, the drive axle extending through a first aperture in the housing, wherein the input drive gear rotates in response to rotation of the drive axle;
an output drive gear rotationally coupled within the housing a predetermined distance below the input drive gear corresponding to an additional ground clearance desired to be provided to the vehicle by the vehicle portal axle system, the output drive gear being configured for coupling to a shaft of a drive hub of the vehicle, the shaft extending through a second aperture in the housing, wherein the drive hub rotates in response to rotation of the output drive gear, wherein the output drive gear is separated from the input drive gear; and
at least one idler gear rotationally coupled within the housing, wherein the at least one idler gear meshes with both the input and output drive gears such that rotation of the input drive gear, in response to rotation of the drive axle, rotates the at least one idler gear, which, in turn, rotates the output drive gear, and wherein a king pin axis is aligned such that a scrub radius of the wheel of the vehicle is not more than a predetermined amount, wherein the predetermined amount is less than or equal to one inch.

2. The vehicle portal axle system of claim 1 comprising two idler gears.

3. The vehicle portal axle system of claim 1, wherein a gear ratio of the vehicle portal axle system is changeable.

4. A portal axle system for a vehicle, comprising:
a spindle coupled to a drive wheel of the vehicle, the spindle comprising:
a housing;
an upper bracket configured to be coupled to an upper control arm of the vehicle; and
a lower bracket configured to be coupled to a lower control arm of the vehicle;
an input drive gear rotatably coupled within the housing, the input drive gear being configured to be coupled to a drive axle of the vehicle that extends through a first aperture in the housing, wherein the input drive gear rotates in response to rotation of the drive axle;
an output drive gear rotatably coupled within the housing at a predetermined distance below the input drive gear, the output drive gear being configured to be coupled to a shaft of a drive hub of the vehicle that extends through a second aperture in the housing, wherein the drive hub rotates in response to rotation of the output drive gear, and wherein the output drive gear is separated from the input drive gear, with the lower bracket disposed within a recess of the output drive gear, and a king pin axis being aligned such that a scrub radius of the wheel of the vehicle is not more than a predetermined amount; and
at least one idler gear rotatably coupled within the housing, wherein the at least one idler gear meshes with both the input and output drive gears such that rotation of the input drive gear, in response to rotation of the drive axle, rotates the at least one idler gear, which, in turn, rotates the output drive gear.

5. The vehicle portal axle system of claim 4, wherein the predetermined amount is less than or equal to one inch.

6. The vehicle portal axle system of claim 4 comprising two idler gears.

7. The vehicle portal axle system of claim 4, wherein a gear ratio of the vehicle portal axle system is changeable.

8. The vehicle portal axle system of claim 4, wherein the output gear is mounted to a first pin.

9. The vehicle portal axle system of claim 4, wherein the input gear is mounted to a first pin.

10. A method for operating a vehicle portal axle system, comprising:
    providing a vehicle comprising a spindle operationally coupled to a drive wheel of the vehicle, the spindle comprising a housing, an upper bracket configured for operational coupling to an upper control arm of the vehicle, and a lower bracket configured for operational coupling to a lower control arm of the vehicle;
    providing an input drive gear rotationally coupled within the housing, the input drive gear being configured for coupling to a drive axle of the vehicle, the drive axle extending through a first aperture in the housing, wherein the input drive gear rotates in response to rotation of the drive axle;
    providing a recessed output drive gear rotationally coupled within the housing a predetermined distance below the input drive gear corresponding to the additional ground clearance desired to be provided to the vehicle by the vehicle portal axle system, the output drive gear being configured for coupling to a shaft of a drive hub of the vehicle, the shaft extending through a second aperture in the housing, wherein the drive hub rotates in response to rotation of the output drive gear, wherein the output drive gear is separated from the input drive gear, the lower bracket being disposed within the recess of the output drive gear, wherein a king pin axis is aligned such that the scrub radius of the wheel of the vehicle is not more than a predetermined amount;
    providing at least one idler gear rotationally coupled within the housing, wherein the at least one idler gear meshes with both the input and output drive gears such that rotation of the input drive gear, in response to rotation of the drive axle, rotates the at least one idler gear, which, in turn, rotates the output drive gear, wherein the input drive gear, the output drive gear and at least one idler gear form a first set of gears;
    providing a first pin protruding from a first cover plate that is integrated into a wall of the housing;
    removing the first cover plate;
    removing at least one gear of the first set of gears, wherein the first pin is utilized to arrange the at least one gear in a meshed configuration;
    replacing the at least one removed gear with a second gear of a different size to form a second set of gears with the gear ratio different from that of the first set of gears; and
    replacing the first cover plate with a second cover plate having at least one second mounting pin coupled thereto in a different location from that of the first cover plate, wherein the second pin is utilized to meshedly fit the second gear into the meshed configuration when the first cover plate is replaced by the second cover plate.

11. The method of claim 10, wherein the predetermined amount is less than or equal to one inch.

12. The method of claim 10, wherein a changing of the gear ratio configures the vehicle to be driven at a different speed.

* * * * *